(12) United States Patent
Ma

(10) Patent No.: US 7,359,617 B2
(45) Date of Patent: Apr. 15, 2008

(54) DUAL MODE TIMELINE INTERFACE

(75) Inventor: Choi Chi Evelene Ma, Ashfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 1115 days.

(21) Appl. No.: 10/393,265

(22) Filed: Mar. 21, 2003

(65) Prior Publication Data

US 2003/0215214 A1    Nov. 20, 2003

(30) Foreign Application Priority Data

Mar. 21, 2002    (AU)    .................... PS 1277

(51) Int. Cl.
*H04N 5/93* (2006.01)
(52) U.S. Cl. ......................... 386/52; 386/55
(58) Field of Classification Search .............. 386/46, 386/52, 55, 65
See application file for complete search history.

(56) References Cited

U.S. PATENT DOCUMENTS 6,016,380 A    1/2000    Norton ................. 386/52
6,031,529 A    2/2000    Migos et al. ............... 345/340
6,539,163 B1 *    3/2003    Sheasby et al. ............... 386/52
6,577,807 B1 *    6/2003    Yaegashi et al. ............. 386/52

FOREIGN PATENT DOCUMENTS

| EP | 0564247 | 10/1993 |
|---|---|---|
| JP | 2000-023080 | 1/2000 |
| JP | 2000-149502 | 5/2000 |
| JP | 2001-202754 | 7/2001 |
| JP | 2001-238172 | 8/2001 |
| WO | WO 00/63913 | 10/2000 |

* cited by examiner

*Primary Examiner*—Huy Nguyen
(74) *Attorney, Agent, or Firm*—Fitzpatrick, Cella, Harper & Scinto

(57) ABSTRACT

A dual-mode GUI (600) is disclosed which includes a source timeline (614) and a manual editing timeline (606) within a common editing window (608). This arrangement enables the user to maintain a contextual appreciation of relationships (618) between a parent clip (616) and a related child segment (602) throughout an iterative editing process (1000). Using a dual-mode approach, after the user has performed auto-editing using an auto-edit GUI (1200), the user then activates the dual-mode GUI (600), in order to proceed with additional manual editing (1000).

30 Claims, 16 Drawing Sheets

DUAL MODE TIMELINE INTERFACE

TECHNICAL FIELD OF THE INVENTION

The current invention relates to editing of video clips, and in particular, to an apparatus and associated Graphical User Interface (GUI) related thereto. The present invention relates to a method and apparatus for editing video clips. The invention also relates to a computer program, and a computer program product including a computer readable medium having recorded thereon a computer program for editing video clips. The invention also relates to an edited video clip produced using an apparatus as claimed.

BACKGROUND ART

Users of consumer video equipment typically accumulate video clips from various sources, and store these clips electronically, either on a Personal Computer (PC), or on a remote database that they are able to access across a network. These individual video clips typically relate to a variety of different subjects and occasions, and the user often wishes to edit one or more of the clips to form a coherent video production.

FIG. 1 shows a functional block diagram of a system 100 that can be used for editing video clips. The system 100 comprises a video clip storage facility 102, a processor 104, video and audio presentation mechanisms 106 and 108 respectively, and an editing and user interface application 110. The aforementioned functional blocks are depicted as communicating over a communication bus 114. It will be appreciated, however, that one or more of the system functional blocks could be remotely located, and accessed over a network, this typically applying most often to the video clip storage facility 102.

Editing of video clips by users of consumer video equipment is often performed using a PC based editing system such as is depicted in FIG. 1. Typical video editing software, exemplified by the editing and user interface application 110, provides the user with a video-editing environment and with tools that can be used to perform "non-linear" video editing of captured video clips. In the present context, non-linear video editing refers to video editing that is not restricted by the order in which video clips have been captured. Video editing requires users to have basic video editing skills in order to make effective use of the software packages. Such basic skills involve fundamental issues such as arranging video footage on a timeline, trimming video clips, cutting out or removing unwanted video clips from raw footage, selecting and applying video transitions and sound tracks to video clips and so on.

FIG. 2 shows a typical Graphical User Interface (GUI) associated with a manual editing system for video clips. The GUI 1100 comprises a browser window 1102 that is typically populated by thumbnail representations of stored video clips, exemplified by a thumbnail 1104. Manual editing can be performed by the user by dragging, as depicted by a dashed arrow 1112, a "source", or "parent" video clip 1106 into a desired position depicted by a reference numeral 1106' in a manual editing timeline 1110. Other parent clips shown in the browser window 1102 can be dragged into desired positions, depicted by a dashed line 1116, in the manual editing timeline 1110 and a final parent clip 1108 can be dragged, as depicted by a dashed arrow 1114, into a final position 1108' in the manual editing timeline 1110.

The user can apply effects to some or all of the selected clips 1106'-1108' that have been inserted into the manual editing timeline 1110, and can also insert inter-clip transitions between desired ones of the aforementioned selected clips.

After the user drags the source clips 1106-1108 into the manual edit timeline 1110, he is able to obtain an overview of the contents of the proposed video production by looking at the incorporated source clips 1106'-1108' within the manual edit timeline 1110. As effects and transitions are incorporated, and as individual "in" and "out" points on the individual clips 1106'-1108' are adjusted, the GUI representation of the manual edit timeline 1110 can be updated to show results of the ongoing processing. In an alternate arrangement, the aforementioned updating of the manual edit timeline 1110 can be initiated by activating a separate "update" control (not shown). In either event, the user is able to appreciate the evolution of the video production by viewing the manual edit timeline 1110 as its contents are processed.

Although the mechanical operation of this manual editing arrangement 1100 is simple, the aforementioned video-editing skills are required in order to produce a quality output. It is, unfortunately, very difficult for novice users with limited video editing knowledge and skill to produce quality productions. In fact, video editing is typically a frustrating, time-consuming and demanding process even for professional video editors.

In order to overcome some of the difficulties associated with manual editing arrangements such as depicted by the GUI 1100 in FIG. 2, an automated, or at least semi-automated technique can be used.

FIG. 3 shows a GUI 1200 for such an automated technique, this being referred to as an "auto-editing" arrangement. The GUI 1200 has a browser window 1202 incorporating thumbnail representations of video clips exemplified by a thumbnail 1204, however instead of the manual editing timeline 1110 shown in FIG. 2, an auto-edit timeline 1214 is depicted. Furthermore, in addition to the browser window 1202 containing parent video clips exemplified by the clip 1204, a template window 1210 is also included, this containing a number of templates exemplified by a template 1212. Templates are software files containing cutting rules, title mattes, transition effects and other elements, as well as rules for the application thereof, these rules having typically being compiled by experienced video editors on a per-theme basis. Accordingly, the template 1212 is directed to a romantic theme, while the template 1216 is directed to an adventure theme.

From a practical perspective, the user drags, as depicted by a dashed arrow 1206, individual parent clips such as the clip 1204 to a desired position 1204' in the auto-edit timeline 1214. Other parent clips can also be dragged from the browser window 1202 and located as desired in various positions depicted by a dashed line 1212 in the auto-edit timeline 1214.

In addition to the aforementioned video clips being incorporated into the auto-edit timeline 1214, a desired one of the templates in the template window 1210 is also dragged into the auto-edit timeline 1214. In the present case, the template 1212, which is directed to a romance theme is dragged, as depicted by an a dashed arrow 1208, to a specified location 1212' in the auto-edit timeline 1214. The auto-edit timeline 1214 is designed to accommodate the selected clips 1204', . . . and the single selected template 1212'. When the user presses a AUTO-EDIT button (not shown) the rules in the template 1212' are automatically applied to the clips exemplified by 1204' that have been incorporated into the auto-edit timeline 1214. Transitions, effects, cutting rules and other video-editing techniques are applied, according to the template 1212' on an automatic basis, to the clips in the auto-timeline 1214, thereby producing an output video production of good quality. It is apparent that the user merely makes a selection of parent clips from the browser window 1202 and arranges them in a desired sequence in the auto-edit timeline 1214. The user also selects an appropriate template from the template window 1210. Having performed these simple operations, the auto-editing arrangement, in conjunction with the selected template 1212', produces a high quality production. Clearly the auto-editing arrangement exemplified by the GUI 1200 significantly simplifies video editing for the inexperienced user.

Unlike the situation with the manual edit timeline 1110 (see FIG. 2), the auto-edit timeline 1214 presents a static display containing the individual source clips 1204' . . . and the selected template 1212', up to till the point the user initiates the auto-edit process.

As well as being useful for novice editors, the auto-editing arrangement of FIG. 3 can be used as an initial pre-processing step by advanced video editors, who typically take the output production from the auto-editing process, and perform further manual editing or "polishing" of that production to arrive at really high-quality output video productions. The use by advanced users of the auto-editing process as a preliminary step in the overall video-editing activity can significantly reduce the time and effort required by the advanced user in order to arrive at a final product.

FIG. 4 depicts an editing process 1000 used by a typical advanced user using a system that supports both the GUI 1200 and the GUI 1100. The process commences at a step 1002 which activates the GUI 1200, after which source, ie parent clips are selected from the browser window 1202 at a step 1006. Thereafter, a template is selected from the template window 1210 at a step 1010. The auto-editing process is thereafter initiated at a step 1014. After completion of the auto-editing process in the step 1014, the process 1000 is directed to a decision step 1028 at which point the user makes a decision as to whether the auto-edited production is in itself satisfactory, or whether in contrast, further manual editing is required. If the auto-edited production is deemed to be satisfactory, then the process 1000 is directed in accordance with a "no" arrow to a termination step 1030. If, on the other hand, further manual editing is required, then the process 1000 is directed in accordance with a "yes" arrow to a step 1018.

At this point, after having performed auto-editing using the GUI 1200, the user activates the manual editing GUI 1100 in place of the auto-editing GUI 1200, in order to proceed, in the step 1018, with further manual editing of the auto-edited production, that has been produced by the auto-editing process in the step 1014. In a following testing step 1022, the user assesses whether the video production resulting from the manual editing step 1018 is of acceptable quality. If this is the case, then the process 1000 is directed in accordance with a "yes" arrow 1024 to a step 1026 where the process terminates, outputting the final polished video production. If, on the other hand, the step 1022 concludes that the video production produced in the step 1018 is not yet of an acceptable quality level, then the process 1000 is directed in accordance with a "no" arrow 1028 back to the step 1018.

Considering the auto-editing technique in further detail, it is noted that the video auto-editing process, such as described in relation to FIG. 4, generally takes a source or parent clip, such as the source clip 1204' in the auto-edit timeline 1214 of FIG. 3, and places various segments thereof in different positions in the video production that is output from the auto-editing process.

FIG. 5 shows how segments 602, 628 of a parent clip 616 (which is designated "c1" to indicate that the parent clip 616 is the first clip in the auto-edit timeline 1214) are positioned in a time-line 606. The time-line 606 is a temporal representation of the video production produced by the auto-edit process. The segments 602, 628 are extracted, as depicted by dashed arrows 618 and 620, from the parent clip 616 by the auto-edit process, and positioned in the output production time-line 606 as shown. The segments 602 and 628 are designated "s1" and "s6" respectively to indicate that they are the $1^{st}$ and $6^{th}$ segments in the resultant output video production shown in the time-line 606. As described in relation to the steps 1018 and 1022 in FIG. 4, the contents of the timeline 606 can be subjected to an iterative manual editing process in order, for example, to add and vary in/out points of the segments 602, 628 as well as to change effects and transitions applied thereto.

Video editing software applications which support both the manual editing functionality as described in relation to FIG. 2, and the auto-editing capability as described in relation to FIG. 3, offer these video editing modes as separate facilities, as exemplified by the separate GUIs 1100 and 1200 in FIGS. 2 and 3 respectively. Users thus typically have to terminate an editing process using one of the editing modes in order to use the other editing mode.

When a user switches from the auto-editing mode to the manual editing mode, the clip segments that have been created by the auto-editing process, as exemplified by the segments 602 and 628 in the timeline 606 of FIG. 5, are made available to the user for manual editing, in the manual editing timeline 1110 described in relation to FIG. 2. The manual editing time-line 1110 will generally be populated with the child segment clips 602-628 from the source clip 616, and also with child segments from other parent clips which were included in the auto-editing process. It is extremely difficult for the user at this point to determine the relationship between the child segments in the manual time-line 1110 and their associated (originating) parent clips. Having lost a clear appreciation of the relationship between his original selection of parent clips and the resultant child segments upon which be now intends to perform manual editing, the user typically suffers from a loss of contextual appreciation, which degrades his ability to perform the desired manual editing effectively. This reduces the workflow efficiency and productivity of the user.

It is apparent that this problem is exacerbated as the number of parent and child clips multiply, as is typically the case in normal video editing processes.

SUMMARY OF THE INVENTION

It is an object of the present invention to substantially overcome, or at least ameliorate, one or more disadvantages of existing arrangements.

According to a first aspect of the invention, there is provided a method for editing a sequence of video clips, the method comprising the steps of:

auto-editing, using an auto-editing template, a parent video clip selected form the sequence of video clips to thereby produce a video production having a child video segment related to the parent video clip;

maintaining information on the relationship between the parent video clip and said related child segment;

displaying on a Graphical User Interface corresponding representations of the parent video clip, the video production, and said information; and manually editing, dependent upon said displayed information, said child video segment.

According to another aspect of the invention, there is provided a method for identifying, in a Graphical User Interface displaying (a) a source time line depicting a plurality of parent video clips the source time line being characterised by a source Edit Display List and (b) a manual time line depicting an associated video production having child elements related to at least some of said parent video clips the manual time line being characterised by a manual Edit Display List, the parent video clip which is related to a selected child segment in the video production, the method comprising the steps of:

selecting the child segment in the manual time-line;

identifying, in the manual Edit Display List, the child Edit Display List element representing the selected child segment; and determining, from the child Edit Display List element, a reference to the related parent video clip.

According to another aspect of the invention, there is provided a method for identifying, in a Graphical User Interface displaying (a) a source time line depicting a plurality of parent video clips the source time line being characterised by a source Edit Display List and (b) a manual time line depicting an associated video production having child elements related to at least some of said parent video clips said manual time line being characterised by a manual Edit Display List, a child segment related to a selected parent video clip in the source time-line, the method comprising the steps of:

selecting the parent video clip in the source time-line;

identifying, in the source Edit Display List, the parent Edit Display List element representing the selected parent video clip; and determining, from the parent Edit Display List element, a reference to the related child segment.

According to another aspect of the invention, there is provided a method for editing, in a Graphical User Interface displaying (a) a source time-line depicting a plurality of parent video clips the source time-line characterised by a source Edit Display List and (b) a manual time line depicting an associated video production having child elements related to at least some of said parent video clips, said manual time-line characterised by a manual Edit Display List, a child segment in the manual time-line, the method comprising the steps of:

activating the child segment in the manual time-line;

identifying, in the manual Edit Display List, the child Edit Display List element representing the activated child segment;

determining, from the child Edit Display List element, attributes for the activated child segment; and editing said attributes.

According to another aspect of the invention, there is provided an apparatus for editing a sequence of video clips, the apparatus comprising:

an auto-editor for auto-editing, using an auto-editing template, a parent video clip selected from the sequence of video clips to thereby produce a video production having a child video segment related to the parent video clip;

means for maintaining information on the relationship between the parent video clip and said related child segment;

a Graphical User Interface for displaying corresponding representations of the parent video clip, the video production, and said information; and a manual editor for manually editing, dependent upon said displayed information, said child video segment.

According to another aspect of the invention, there is provided an apparatus comprising:

an auto-editor for auto-editing, using an auto-editing template, a parent video clip selected from a sequence of video clips to thereby produce a video production having a child video segment related to the parent video clip;

a Graphical User Interface;

means for displaying on the Graphical User Interface (a) a source time-line depicting said parent video clip said source time-line characterised by a source Edit Display List and (b) a manual time-line depicting said video production the manual time-line characterised by a manual Edit Display List;

means for selecting the child segment in the manual time-line;

means for identifying, in the manual Edit Display List, the child Edit Display List element representing the selected child segment; and means for determining, from the child Edit Display List element, a reference to the related parent video clip.

According to another aspect of the invention, there is provided an apparatus comprising:

an auto-editor for auto-editing, using an auto-editing template, a parent video clip selected from a sequence of video clips to thereby produce a video production having a child video segment related to said parent video clip;

a Graphical User Interface;

means for displaying on the Graphical User Interface (a) a source time-line depicting said parent video clip said source time-line characterised by a source Edit Display List and (b) a manual time-line depicting said video production said manual time-line characterised by a manual Edit Display List;

means for selecting the parent video clip in the source time-line;

means for identifying, in the source Edit Display List, the parent Edit Display List element representing the selected parent video clip; and means for determining, from the parent Edit Display List element, a reference to the related child segment.

According to another aspect of the invention, there is provided an apparatus comprising:

an auto-editor for auto-editing, using an auto-editing template, a parent video clip selected from a sequence of video clips to thereby produce a video production having a child video segment related to the parent video clip;

a Graphical User Interface;

means for displaying on the Graphical User Interface (a) a source time-line depicting said parent video clip said source time-line characterised by a source Edit Display List and (b) a manual time-line depicting the video production said manual time-line characterised by a manual Edit Display List;

means for activating the child segment in the manual time-line;

means for identifying, in the manual Edit Display List, the child Edit Display List element representing the activated child segment;

means for determining, from the child Edit Display List element, attributes for the activated child segment; and means for editing said attributes.

According to another aspect of the invention, there is provided an apparatus for editing a sequence of video clips, said apparatus comprising:

a memory for storing a program; and a processor for executing the program, said program comprising:

code for auto-editing, using an auto-editing template, a parent video clip selected from the sequence of video clips to thereby produce a video production having a child video segment related to the parent video clip;

code for maintaining information on the relationship between the parent video clip and said related child segment;

code establishing a Graphical User Interface for displaying corresponding representations of the parent video clip, the video production, and said information; and code for manually editing, dependent upon said displayed information, said child video segment.

According to another aspect of the invention, there is provided an edited video clip when produced using an apparatus for editing a sequence of video clips, the apparatus comprising:

an auto-editor for auto-editing, using an auto-editing template, a parent video clip selected from the sequence of video clips to thereby produce a video production having a child video segment related to the parent video clip;

means for maintaining information on the relationship between the parent video clip and said related child segment;

a Graphical User Interface for displaying corresponding representations of the parent video clip, the video production, and said information; and a manual editor for manually editing, dependent upon said displayed information, said child video segment.

According to another aspect of the invention, there is provided a computer program for directing a processor to execute a procedure for editing a sequence of video clips, said program comprising:

code for auto-editing, using an auto-editing template, a parent video clip selected from the sequence of video clips to thereby produce a video production having a child video segment related to the parent video clip;

code for maintaining information on the relationship between the parent video clip and said related child segment;

code establishing a Graphical User Interface for displaying corresponding representations of the parent video clip, the video production, and said information; and code for manually editing, dependent upon said displayed information, said child video segment.

According to another aspect of the invention, there is provided an Edit Display List data structure referring to a parent video clip and a child video segment related to the parent video clip, said Edit Display List data structure comprising:

a source Edit Display List including a parent Edit Display List element having a reference to said parent video clip, and a reference to a child Edit Display List element in a manual Edit Display List, said child Edit Display List element being associated with the child video segment; and said manual Edit Display List including said child Edit Display List element having a reference to said source Edit Display List element.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
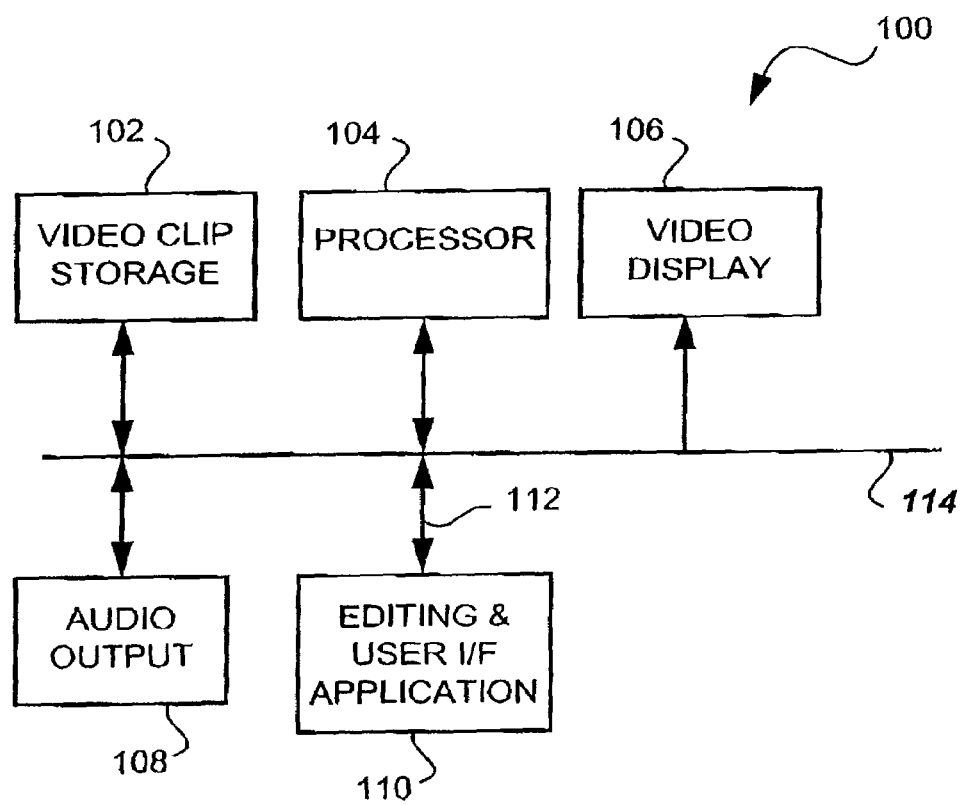
FIG. 1 shows a functional block diagram of a system 100 that can be used for editing video clips.

Where reference is made in any one or more of the accompanying drawings to steps and/or features, which have the same reference numerals, those steps and/or features have for the purposes of this description the same function(s) or operation(s), unless the contrary intention appears.

Before proceeding with a description of the various editing arrangements, a number of terminology issues are first set out. In the present description, the terms "source clip" and "parent clip" are used interchangeably unless a particular intent is specified by the context. Similarly, the terms "child segment" and "segment" are also used interchangeably in the same manner.

Figure 6:
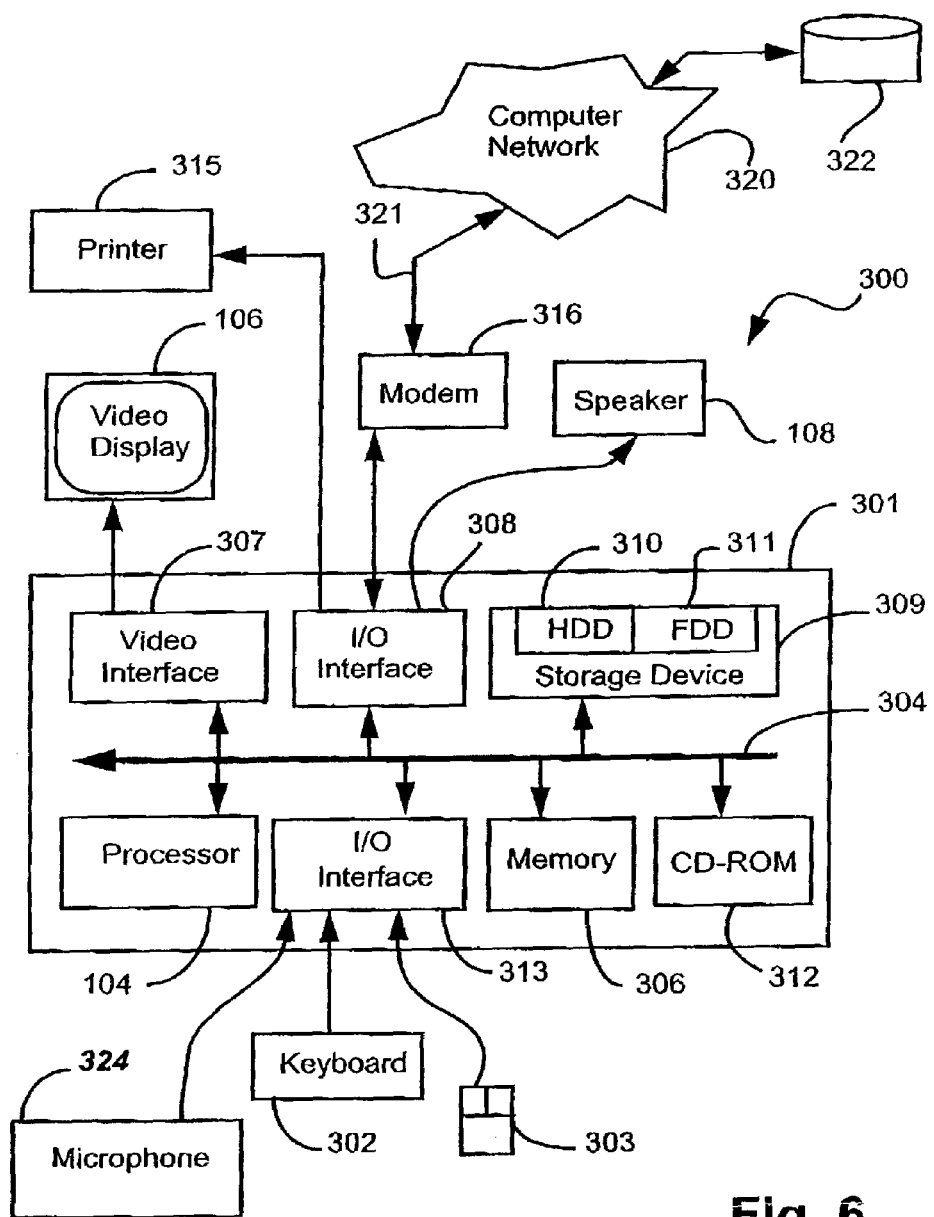
FIG. 6 shows a general purpose computer upon which arrangements described can be practiced.

The disclosed method of video editing is preferably practiced using a general-purpose computer system 300, such as that shown in FIG. 6 wherein the processes of FIGS. 11, 12, 14, 15 and 16 may be implemented as software, such as an application program executing within the computer system 300. In particular, the method steps of video editing are effected by instructions in the software that are carried out by the computer. The instructions may be formed as one or more code modules, each for performing one or more particular tasks. The software may also be divided into two separate parts, in which a first part performs the video editing methods and a second part manages a user interface, such as the GUIs in FIGS. 7 and 13, between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for video editing.

The computer system 300 comprises a computer module 301, input devices such as a keyboard 302, microphones 324, and mouse 303, output devices including a printer 315, audio speakers 108, and a display device 106. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN), in order to access a remote database 322 which can incorporate the video clip storage mechanism 102 (see FIG. 1) or part thereof.

The computer module 301 typically includes at least the one processor unit 104, a memory unit 306, for example formed from semiconductor random access memory (RAM) and read only memory (ROM), input/output (I/O) interfaces including a video interface 307, and an I/O interface 313 for the keyboard 302 and mouse 303 and optionally a joystick (not illustrated), and an interface 308 for the modem 316. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 104, and 306-313 of the computer module 301, typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations or alike computer systems evolved therefrom. The video clip storage mechanism 102 in FIG. 1 can comprise some or all of the remote database 322, the storage device 309, the memory unit 306 and the CD-ROM 312.

Typically, the application program is resident on the hard disk drive 310 and read and controlled in its execution by the processor 104. Intermediate storage of the program and any data fetched from the network 320 may be accomplished using the semiconductor memory 306, possibly in concert with the hard disk drive 310. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable media. The term "computer readable medium" as used herein refers to any storage or transmission medium that participates in providing instructions and/or data to the computer system 300 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media include radio or infra-red transmission channels as well as a network connection to another computer or networked device, and the Internet or Intranets including email transmissions and information recorded on websites and the like.

The method of video editing may alternatively be implemented in dedicated hardware such as one or more integrated circuits performing the functions or sub functions of video editing. Such dedicated hardware may include graphic processors, digital signal processors, or one or more microprocessors and associated memories, and may be incorporated into consumer equipment such as digital video camcorders.

Figure 7:
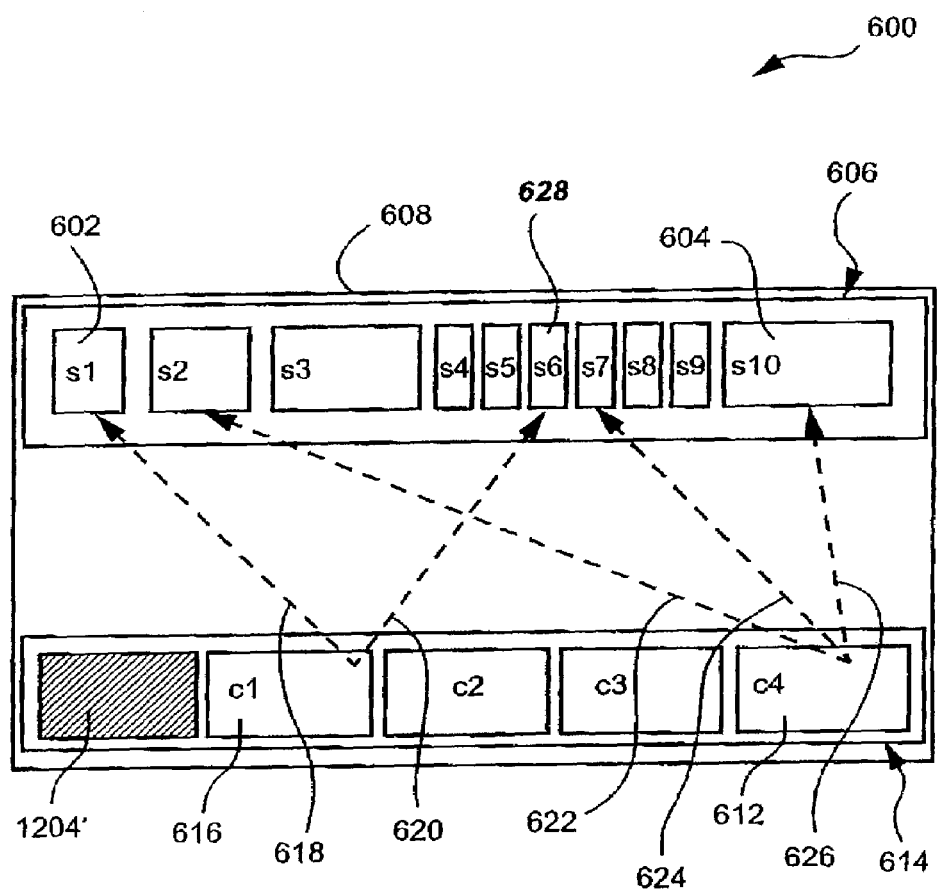
FIG. 7 shows a dual-mode GUI having a source timeline and a manual editing timeline within a common dual-mode editing window.

FIG. 7 shows a dual-mode GUI 600 which includes a source timeline 614 and a manual editing timeline 606 within a common editing window 608. This arrangement enables the user to maintain a contextual appreciation of relationships between parent clips and child segments throughout the iterative editing process described in accordance with FIG. 4. Thus, using the dual-mode approach, after the user has performed auto-editing using the auto-edit GUI 1200, the user then activates the dual-mode GUI 600, in order to proceed with additional manual editing as depicted in the steps 1018 and 1022 of FIG. 4.

The source timeline 614 contains a template representation 1204' as well as a number of parent clips 616-612. The aforementioned parent clips each have an associated label c1-c4 to indicate their positions in the source timeline 614.

Figure 3:
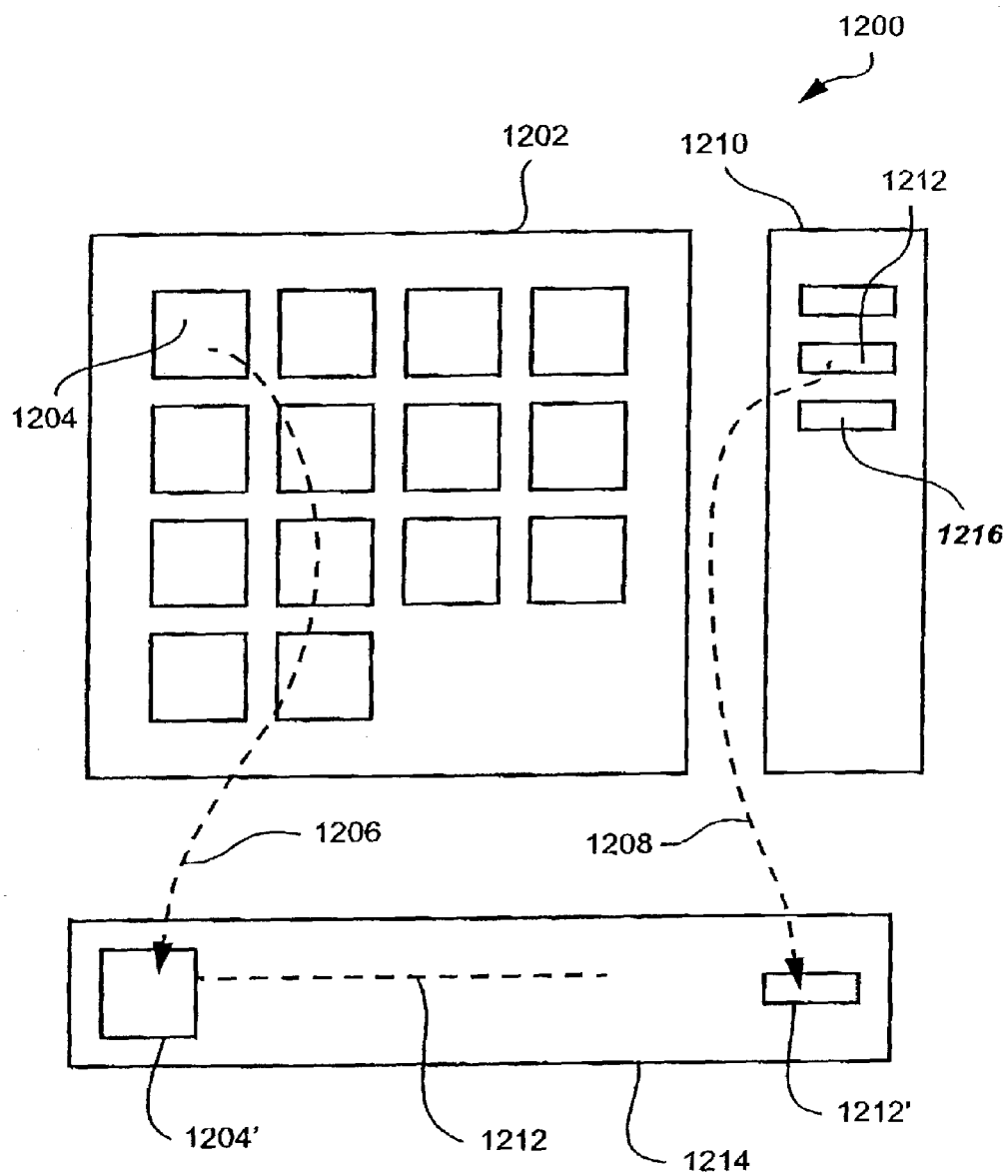
FIG. 3 shows a GUI for an auto-editing arrangement.
Figure 5:
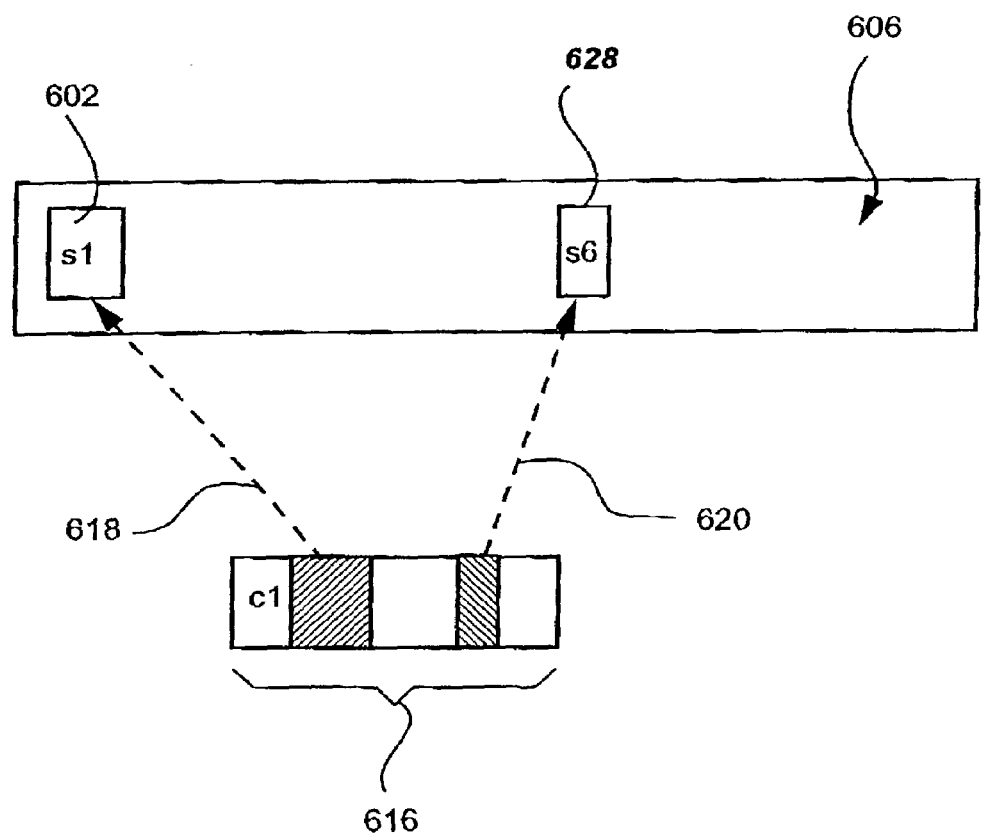
FIG. 5 shows how parent clips are typically mapped into child segments by an auto-edit process.

The source timeline 614 is functionally equivalent to the auto-edit timeline 1214 in FIG. 3. The manual edit timeline 606 represents the output from the auto-edit timeline 614 after performance of the auto-edit process using the template 1204'. Accordingly, and as previously described in relation to FIG. 5, the parent clip 616 produces, as a result of the auto-edit process using the template 1204', the two child segments 602 (i.e. s1) and 628 (i.e. s6) as depicted by the dashed arrows 618 and 620. Similarly, the parent clip 612 produces three child segments s2, s7 and s10 as depicted by dashed arrows 622, 624 and 626 respectively. The dashed arrows 618, 620, if these are displayed in the window 608, enable the user of the GUI 600 to immediately understand that the child clips 602, 628 have been derived from the parent clip 616, and to understand that this has been performed using the template 1204'.

In practice, use of dashed arrows can quickly become confusing, and a colour discrimination approach is preferred. In one arrangement of this approach, the parent clip 616 is shown in a distinctive colour, say canary yellow, as are the associated child segments 602 and 628. If it is desired to show two families (ie parent and children) simultaneously, then the parent clip 612 can, for example, be shown in a different distinctive colour, say lime green, and its associated child segments s2, s7 and s10 can be shown in lime green as well. It is thus evident that the aforementioned colour differentiation scheme allows multiple parent-clip/child-segment "families" to be displayed simultaneously.

In a second arrangement of the colour approach, only one family is considered at a time. In this case, the selected parent is highlighted in one colour (say canary yellow), and all the associated child segments are shown in a second colour (say lime green).

It is noted that the relationships between parent clips and child segments are only displayed if the user activates the appropriate display control function. This control function can be activated, for example, by appropriately selecting parent clips or child segments to thereby see the family relationships.

The user is able to directly make use of the manual edit timeline 606 in order to perform manual editing of the child segments 602-604 (ie s1-s10). Accordingly, the user is able to perform the steps 1002-1014 using the GUI 1200, and thereafter to perform the iterative steps 1018, 1022, 1018 . . . using the single integrated dual-mode GUI 600. The dual-mode editing arrangement enables the user to maintain a contextual appreciation of the relationships between the child segments s1-s10 in the manual timeline 606 and the parent clips c1-c4 in the source timeline 614.

The dashed arrows 618-620 and 622-626 (or an equivalent information representation such as the colour discrimination scheme which has been described, or an explanatory text in an additional display window) can be displayed in the GUI 600 to provide the user with the explicit information on the aforementioned relationships. It will be apparent that other arrangements enabling the user to maintain a contextual appreciation of relationships between parent clips and child segments can also be used. The user can thus move smoothly from the auto-edit function using the GUI 1200 to the manual edit function using the GUI 600 without losing a contextual appreciation of the relationship between the parent clips and child segments.

Figure 8:
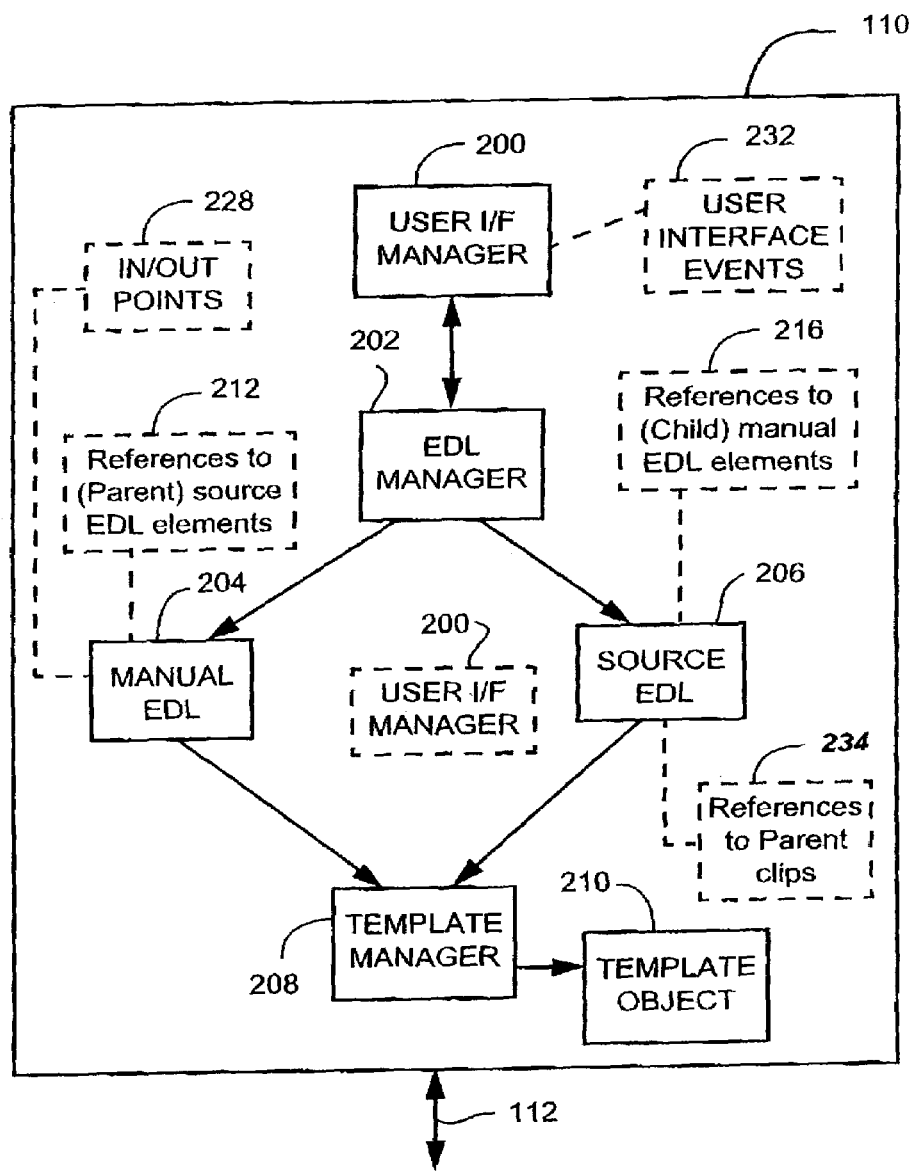
FIG. 8 shows functional elements underpinning the dual-mode GUI.

FIG. 8 shows a functional block diagram of functional elements under-pinning the dual-mode GUI 600. A user interface manager 200 handles interface operations with the user, and in particular manages and updates the GUI 600 (see FIG. 7). The user interface manager 200 thus accepts user interface events 232, such as mouse clicks and changes in the timelines 614 and 606, and updates the contents displayed in the aforementioned timeline components which flow from these user events 232. The user interface manager 200 interacts with an Edit Display List (EDL) manager 202 which manages a manual EDL 204 and a source EDL 206. EDLs are memory structures that relate to timeline data, effects, transitions and references to video, image and audio content. Accordingly, an EDL stores information necessary to display and maintain a timeline component such as the source timeline 614 and the manual edit timeline 606.

Figure 2:
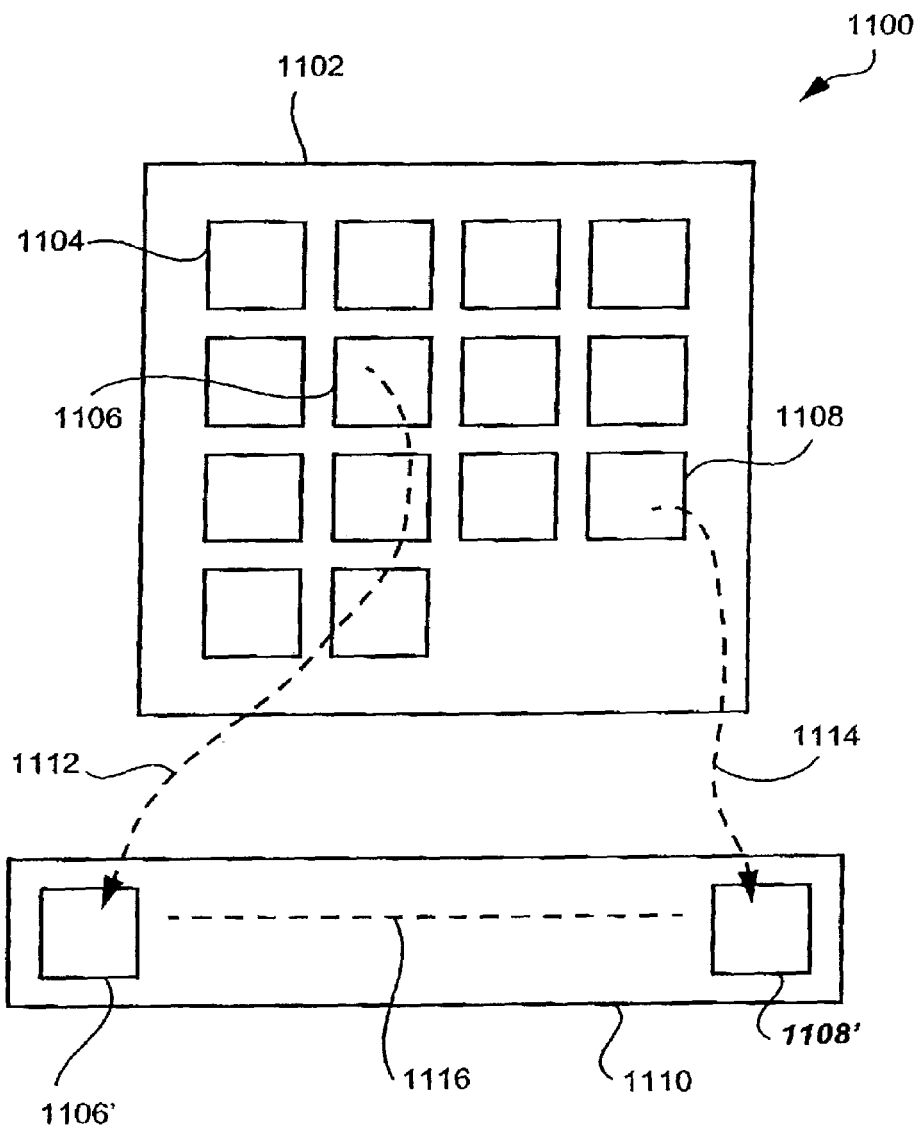
FIG. 2 shows a prior art Graphical User Interface (GUI) for a manual editing arrangement for video clips.
Figure 9:
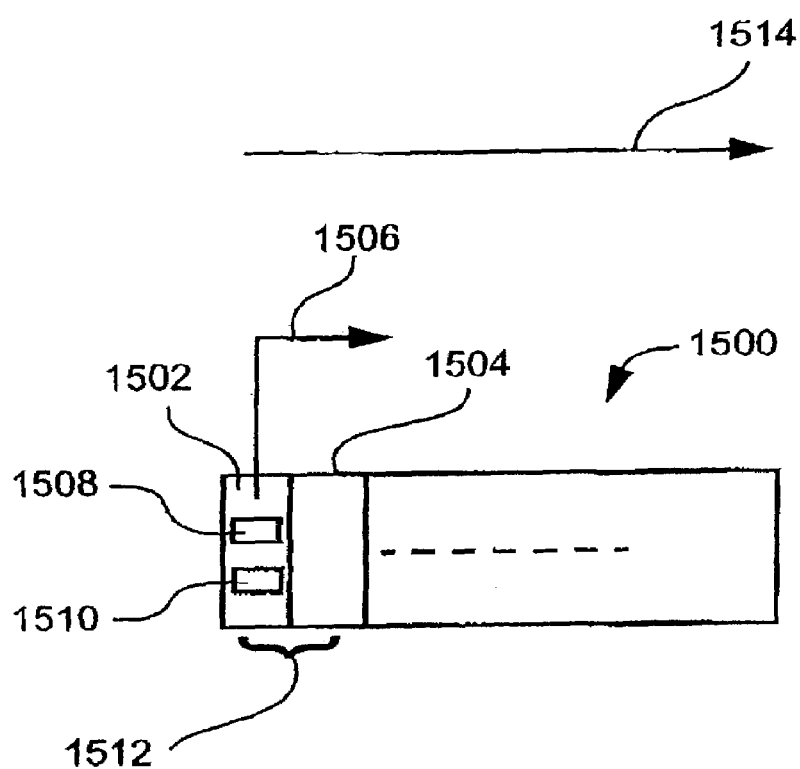
FIG. 9 depicts a conventional EDL.

FIG. 9 shows a representation of a conventional EDL 1500 comprising a sequence of EDL elements 1502, 1504, .... The exemplary EDL element 1502 contains, having regard to video media information, a reference, depicted by an arrow 1506, to a corresponding video clip, as well as in/out data 1508 and effects data 1510 associated with the aforementioned clip. The EDL can also have multiple tracks, to thereby incorporate video, audio, still image and other media information. The EDL elements in the EDL 1500 are generally stored in clip selection order as depicted by an arrow 1514, where this order is generally established by the user as described in relation to FIGS. 2 and 3.

Figure 10:
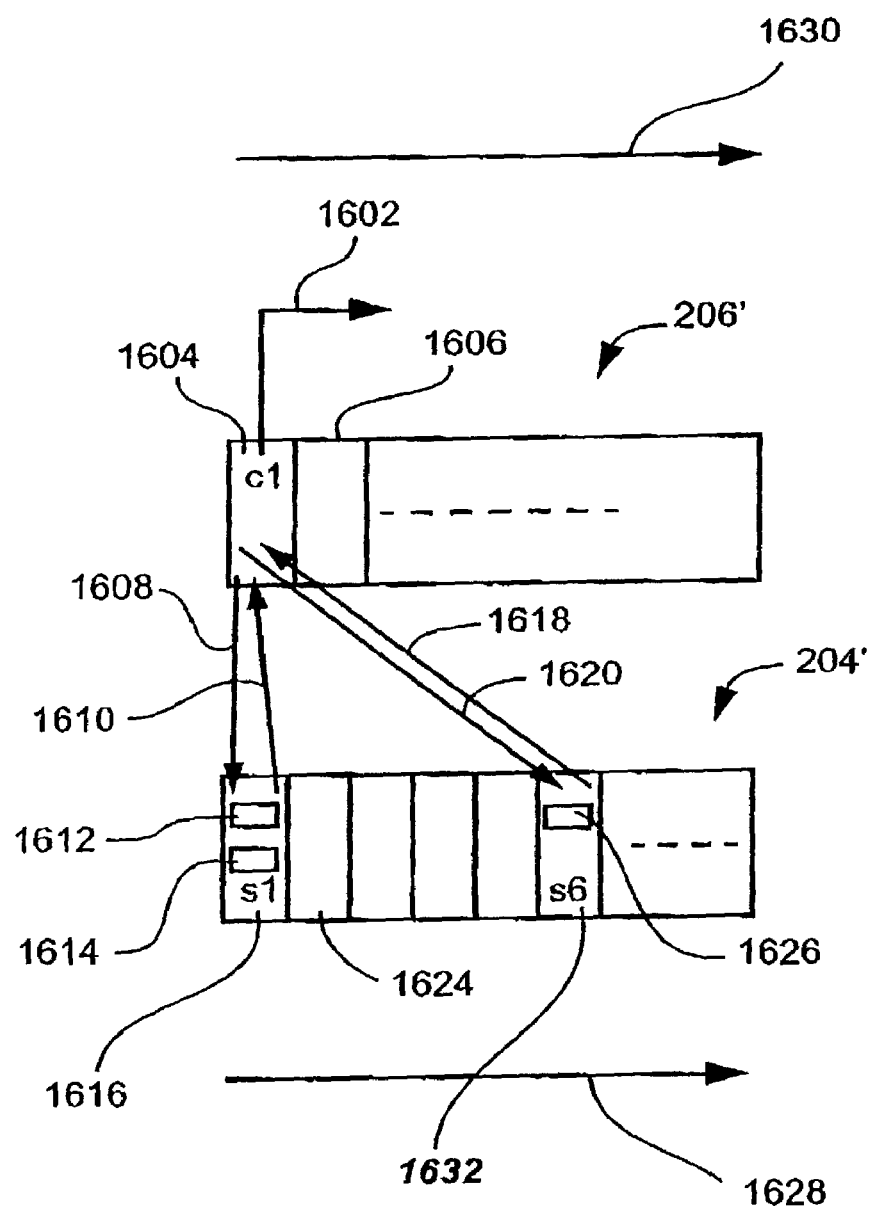
FIG. 10 depicts a dual-mode (ie. coupled) source and manual EDL pair.

FIG. 10 shows a source EDL 206' and a manual EDL 204' pair according to the dual-mode arrangement The source EDL 206' comprises a sequence of EDL elements 1604, 1606, ... The exemplary source EDL (parent clip) element 1604 contains a reference, depicted by an arrow 1602, to an associated parent video clip, and also contains references, depicted by arrows 1608 and 1620, to associated manual EDL (child segment) elements 1616 and 1632 respectively in the manual EDL 204'. The EDL elements 1604, 1616 and 1632 contain respective labels c1, s1 and s6 thereby conforming to the terminology used in FIG. 7. The manual EDL (child segment) elements 1616 and 1632 contain references, depicted by arrows 1610 and 1618, to the source EDL (parent clip) element 1604 in the source EDL 206'. The exemplary manual EDL (child segment) element 1616 contains in/our data and effects data 1612 and 1614 respectively relating to the associated child segment s1. The source EDL elements 1604, 1606, ... are stored in the source EDL 206' in clip selection order as depicted by an arrow 1630. The manual EDL elements 1616 and 1632 are stored in the manual EDL 204' in segment order as depicted by an arrow 1628.

EDL (child) elements in the manual EDL 204' thus contain references to corresponding source EDL (parent) elements which in turn reference parent clips from which corresponding respective child segments have been derived. The manual EDL 204' contains information on the structure of the manual timeline 606, and the source EDL 206' contains information on the structure of the source timeline 614.

Returning to FIG. 8, the source EDL 206 contains, in respect of each parent clip c1-c4, a list 216 of references to manual EDL elements for corresponding child segments derived from each parent. Thus for example, the source EDL 206 contains, in respect of the parent clip 616 (ie. c1) references 1608 and 1620 which show that the child segments 602 and 628 (ie. s1 and s6 respectively) have been derived from the parent 616.

The manual EDL 204 relates to the manual timeline 606, and in respect of the child segment 602 (ie. s1) the manual EDL 204 contains a reference 1610 indicating that the child segment 602 has been derived from the parent clip 616 (ie c1).

Figure 4:
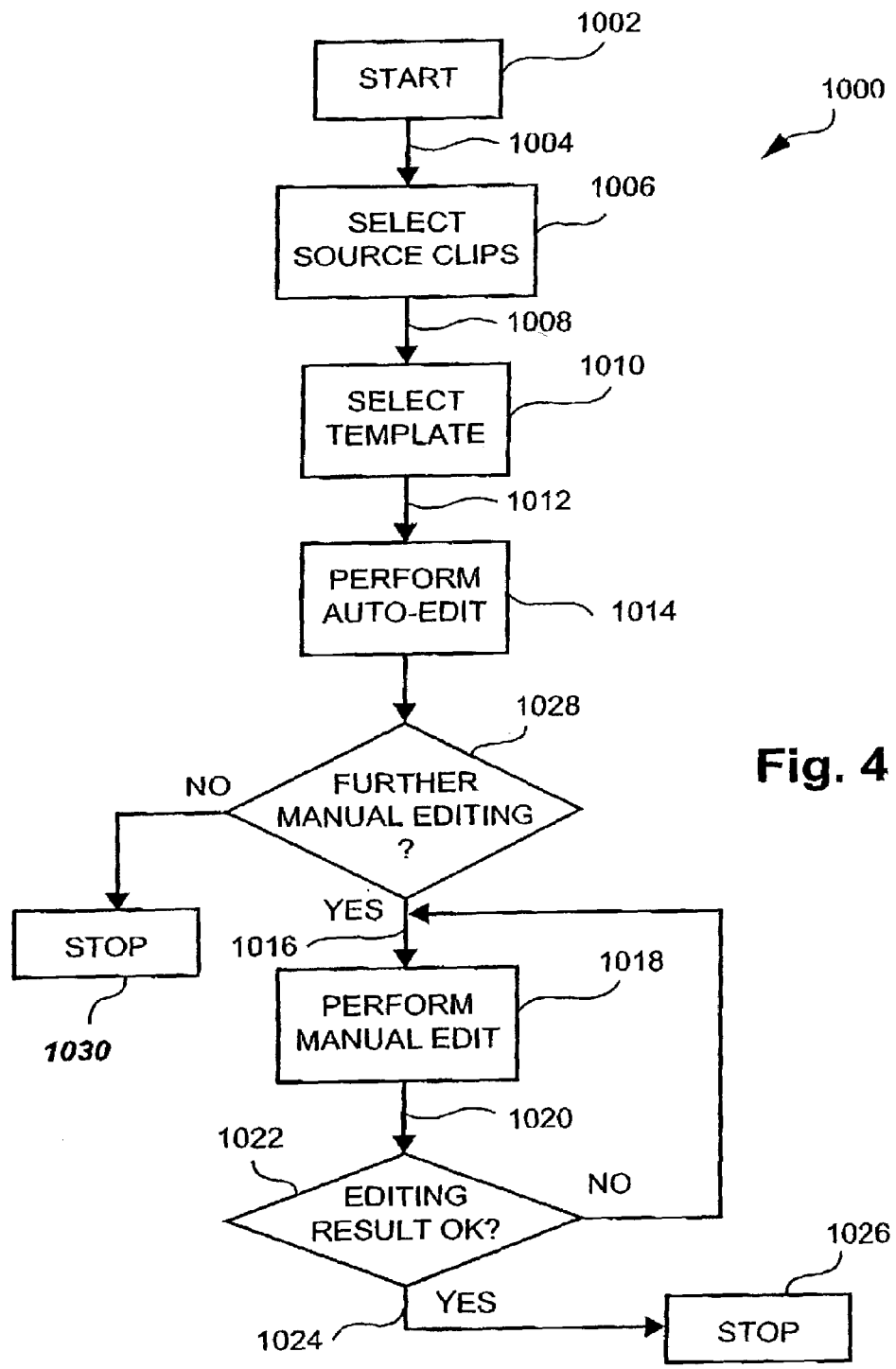
FIG. 4 depicts an editing process for iterative auto/manual editing.

The information contained in both the manual EDL 204' and the source EDL 206' is produced and stored when a template object 210 is applied by a template manager 208 as a consequence of the user initiating the auto-edit process in the step 1014 of FIG. 4. Furthermore, the information in both the source EDL 206' and the manual EDL 204' is updated as a result of the manual editing steps 1018 and 1022 in FIG. 4.

The template object 210 is a data file storing all the template elements of the selected template 1204' (see FIG. 7). As previously noted, the template 1204' typically contains cutting rules, title mattes, transition effects and other elements, where the cutting and other rules have been compiled by expert video editors. When the user has populated the auto-edit timeline 1214 with the desired parent clips 616-612 (ie c1-c4), and has inserted the template 1204' and when the user has initiated the auto edit process by, for example, pressing an auto edit control button, then the template manager 208 reads in the template object 210 and applies the data therein to the parent clips 616-612 in the auto-edit time line 1214. Once the auto-edit process has been completed, the user can activate the GUI 600, and the output produced by applying the template object 210 to the source EDL 206 is stored in the manual EDL 204, the contents of which are displayed in the manual timeline 606 of the GUI 600.

The EDL manager 202 maintains, in the manual EDL 204, in/out points on a per-segment basis for the child segments s1-s10 in the manual timeline 606 as indicated by a dashed box 228. The manual EDL 204 also maintains references 212 to corresponding source EDL (parent) elements associated with corresponding parent clips. The source EDL 206 maintains references 216 to corresponding manual EDL (child) elements associated with corresponding child segments.

If we consider, for example, a template having a simple cutting rule defined as "cut alternate segments (i.e., child segments) from (parent) video clips with alternating tempos of 4 seconds and 10 seconds" then the manual EDL 204 will consist of EDL elements associated with alternating child segments having respective durations of 4 seconds and 10 seconds. This exemplary template also has rules for applying title mattes, transition effects, sound tracks and other elements, and these are applied to the aforementioned alternating child segments.

FIG. 8 also shows that the source EDL 206 has references 234 to the parent clips c1-c4 from which the child segments s1-s10 are derived.

Returning to FIG. 10, the user is able to delete the exemplary child segment s1 by deleting all the information in the corresponding EDL element 1616, and by updating the list of references in the corresponding EDL element 1604 which relates to the associated parent clip, by deleting the reference 1608 in the present example.

Although not shown explicitly in FIG. 10, the references to the manual EDL elements associated with the child segments s1, . . . , s6 (these references being stored in the source EDL element 1604 associated with the associated parent clip c1) are stored in the source EDL element 1604 in an ordered fashion. The order of these references is updated when the child segments s1, . . . , s6 in the manual EDL 204' are reordered, for example by dragging one of the child segments from one position to another position in the manual EDL 204'.

The user can also add an additional child segment from a desired parent clip by simply creating an additional EDL element in the manual EDL 204'. This can be done by selecting, for example, the child segment 1616, and pasting a "new" instance thereof into a desired position in the manual EDL 204'. This creates a new child segment in the manual EDL 204' having the same data as the copied child segment 1616. Accordingly, the new child segment contains a copy of the reference 1610 referring back to the parent clip 1604. The parent clip 1604 does not, however, have a corresponding reference to the new child segment, since the reference 1608 to the copied child segment 1616 resides in the parent clip 1604 and is not replicated by the creation of the new child segment. Accordingly, the EDL manager 202 (see FIG. 8) creates this new reference in the parent clip 1604 pointing to the new child segment. Thereafter, the new child segment can be moved as previously described, and in/out points can be adjusted as will be described in relation to FIG. 13.

One of the capabilities provided by the dual mode GUI 600 in FIG. 7 is to provide the user with a simple and convenient method for identifying relationships between the parent clips 616-612 (ie c1-c4) in the source timeline 614, and the children segments 602-604 (ie s1-s10) in the manual timeline 606.

Figure 11:
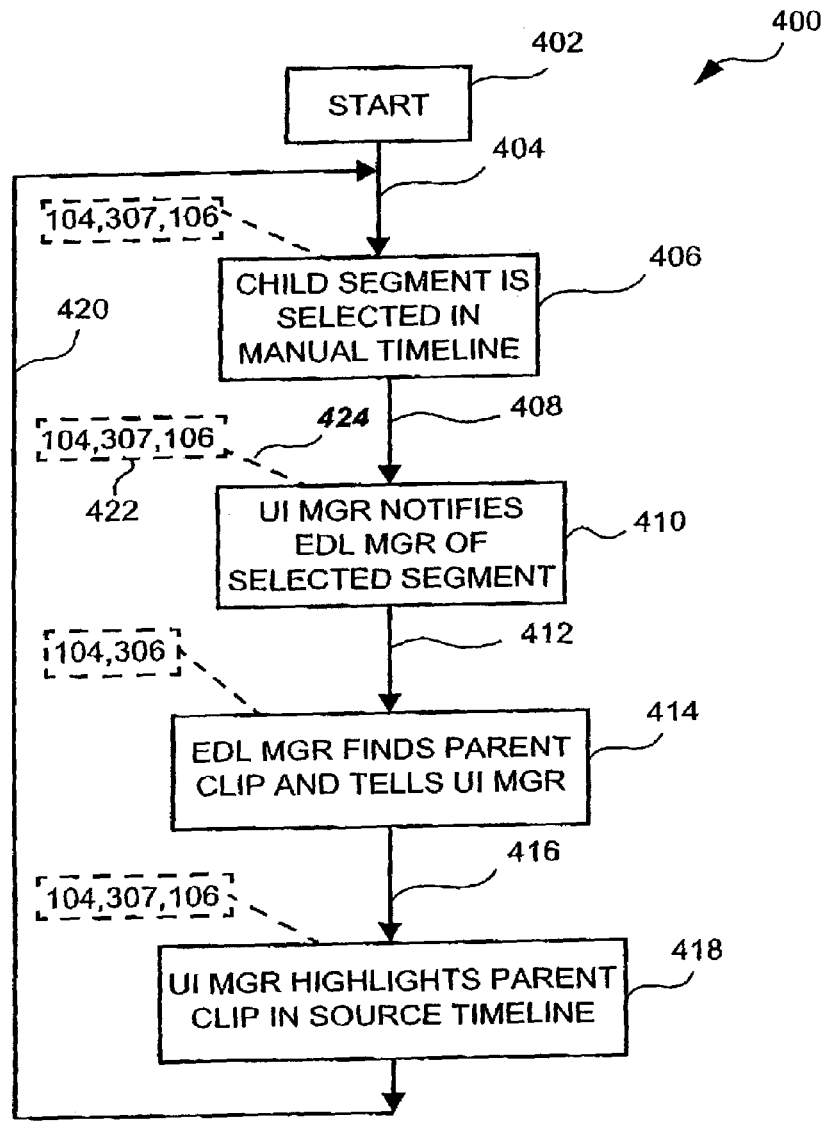
FIG. 11 shows a flow chart showing how a parent clip is identified when a child segment is selected.

FIG. 11 shows a process flow diagram 400 whereby a user can simply and conveniently discover which parent clip gave rise to a selected child segment. The process 400 commences with a starting step 402, after which a child segment is selected in the manual timeline 606 in a step 406. In a step 410 the user interface manager 200 detects the corresponding mouse click event and determines which segment in the manual timeline 606 has been selected, and notifies the EDL manager 202 which child segment has been selected. In a subsequent step 414 the EDL manager 202 looks at the manual EDL 204 and finds a corresponding reference (in 212) to the source EDL element which references the corresponding parent clip of the selected child segment identified in the step 410. The EDL manager 202 then identifies where the parent clip resides and informs the UI manager 200. In a following step 418 the user interface manager 200 highlights the appropriate parent clip in the source timeline 614. The process 400 is then directed in accordance with an arrow 420 back to the step 406, thereby allowing the user to select another child segment in the manual timeline 606.

The step 410 can be implemented, in one arrangement indicated by reference numerals contained in a dashed box 422 connected by a dashed line 424 to the step 410 in question, by the processor 104, in conjunction with the video interface 307 and the video display 106 (see FIG. 6).

Similarly the step 414 can be implemented by the processor 104 in conjunction with the memory 306 in which the manual EDL and the source EDL (204 and 206 respectively) are stored. Similarly, the step 418 can be implemented by the processor 104 in conjunction with the video interface 307 and the video display 106.

Figure 12:
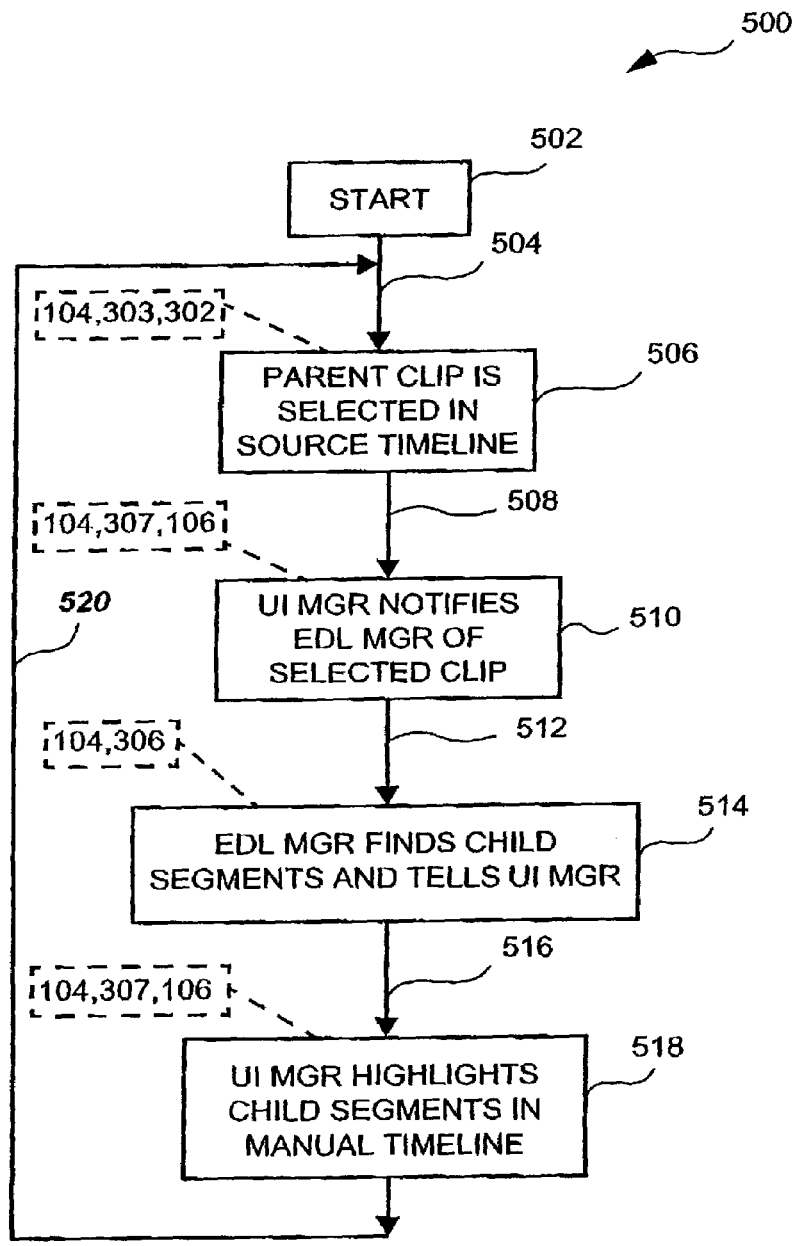
FIG. 12 is a flow chart showing how a child clip segment is identified when a parent clip is selected.

FIG. 12 shows a process flow diagram 500 whereby child segments in the manual timeline 606 can be simply and conveniently identified in relation to a selected parent clip in the source timeline 614. The process 500 commences with a start step 502, after which a parent clip is selected in the step 506 in the source timeline 614. Thereafter, in a step 510 the user interface manager 200 notifies the EDL manager 202 which parent clip has been selected in the source timeline 614. In a following step 514 the EDL manager 202 looks into the source EDL 206 in order to find references to manual EDL elements that reference the child segments associated with the aforementioned selected parent clip. The EDL manger 202 then identifies where the child segments reside and informs the UI manager 200. In a following step 518 the user interface manager 200 highlights the appropriate child segments in the manual timeline 606.

The process 500 is then directed in accordance with an arrow 520 back to the step 506, thereby allowing the next parent clip in the source timeline 614 to be selected.

Figure 13:
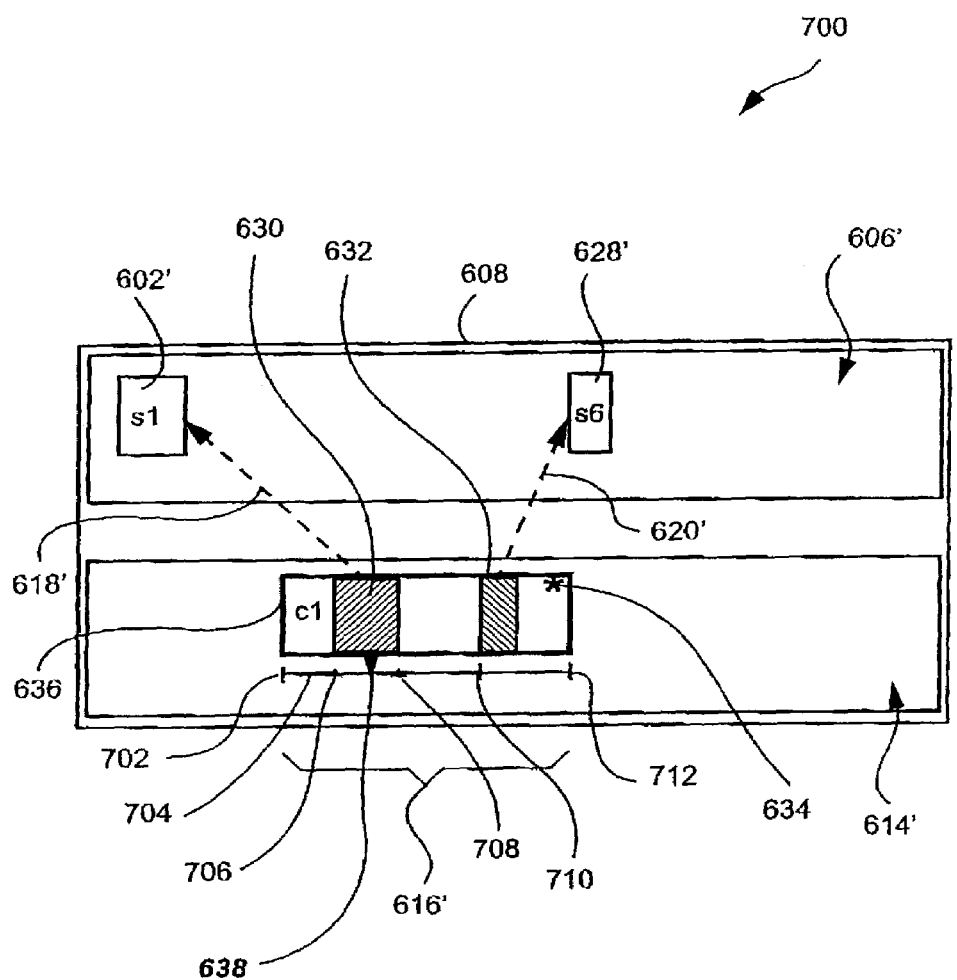
FIG. 13 shows a mini preview window and editing controls provided by the dual mode GUI.

FIG. 13 shows a fragment 700 of the GUI 600 showing how the dual mode GUI 600 allows a user to edit contents of a child segment. In particular, editing is performed by adjusting in and out points of the child segment through manipulation of a graphical control applied to the associated parent clip. The user initiates the aforementioned process by double clicking on the child segment 602' in the manual timeline 606'. This "double clicking" is referred to as "activation" to differentiate it from "selection" which involves "single clicking" on a segment or clip. The user interface manager 200 interprets this double-click event and informs the EDL manager 202 which child segment in the manual timeline 606' has been activated. The EDL manager 202 then looks into the manual EDL 204 in order to identify references 212 to the corresponding parent clip 616' in the source timeline 614'. The EDL manager 202 further identifies all child segments in the manual timeline 606' that derive from the aforementioned parent clip 616'.

Using the references to the aforementioned child segments, the EDL manager 202 compiles, from in/out information stored in each child segment EDL element, a list containing all in and out points of child segments derived from the particular parent clip in question. Accordingly, when the user double clicks on the child segment 602' the EDL manager 202 compiles a list containing in and out points for both child segments 602' and 628'. This list of in and out points is sent to the user interface manager 200. Thereafter, a thumbnail area 636, which is encompassed in a bold border, of the parent clip 616' is made into a mini-preview window 636, in which the child clip 602' which has been activated by the user is previewed. The preview shows the user the video of the activated child segment 602', which corresponds to that part of the associated parent clip c1 between the in and out points 706 and 708 respectively.

A graphic control 704 for in and out points is displayed under the parent clip 616', this control extending from a left-hand extremity 702 of the parent clip 616' to a right-hand extremity 712 thereof. The graphic control 704 also functions as a graphic time-line summary bar and has a scrubber control 638 to indicate which time instant of the child segment 602' is presently being shown in the preview window 636. Current in and out points 706 and 708 respectively are displayed on the control 704 to depict the time interval within the parent clip 616' from which the child segment 602' has been derived. It is noted that the line segment between the in/out controls 706, 708 can be highlighted in a desired colour for user convenience. A hashed rectangle 630 has been shown in FIG. 13 to illustrate the correspondence between the child segment 602' and the time interval within the parent 616' from which the child segment 602' has been derived.

The in and out points 706 and 708 of the child segment 602' can be adjusted along the control 704, thereby adjusting the time duration of the child segment 602' in the overall presentation shown in the manual timeline 606'. A star 634 appears in the preview window 636 if the "out" control 708 is moved in a rightward direction and reaches a point 710 at which the child segment 628' commences. This informs the user when a particular portion of the parent clip 616' has already been used in another child segment such as the segment 628'.

It is noted, in regard to FIG. 13, that the parent clip 616' is not itself being edited. It is rather the child segments such as 602' that are being edited, for example by manipulating the in/out points relating thereto. In fact, parent clips cannot typically be added or deleted from the source timeline 614'.

The user interface manager 200 keeps track of the various in and out points 228 and tests for overlaps. When an overlap occurs the user interface manager 200 controls display of the star 634 thereby warning the user that such overlap has occurred. Furthermore, when the out control 708 reaches the point 710, the child segment 628' is highlighted In this manner, the user is informed not only that a collision, or an overlap has occurred, but is also informed which particular child segment is involved in the overlap. The user can terminate the preview/editing process by double clicking again on the child segment 602'. The EDL manager 202 then saves the new in and out points in the respective EDL elements, in the manual EDL 204, for those child segments whose in and out points have been changed.

Figure 14:
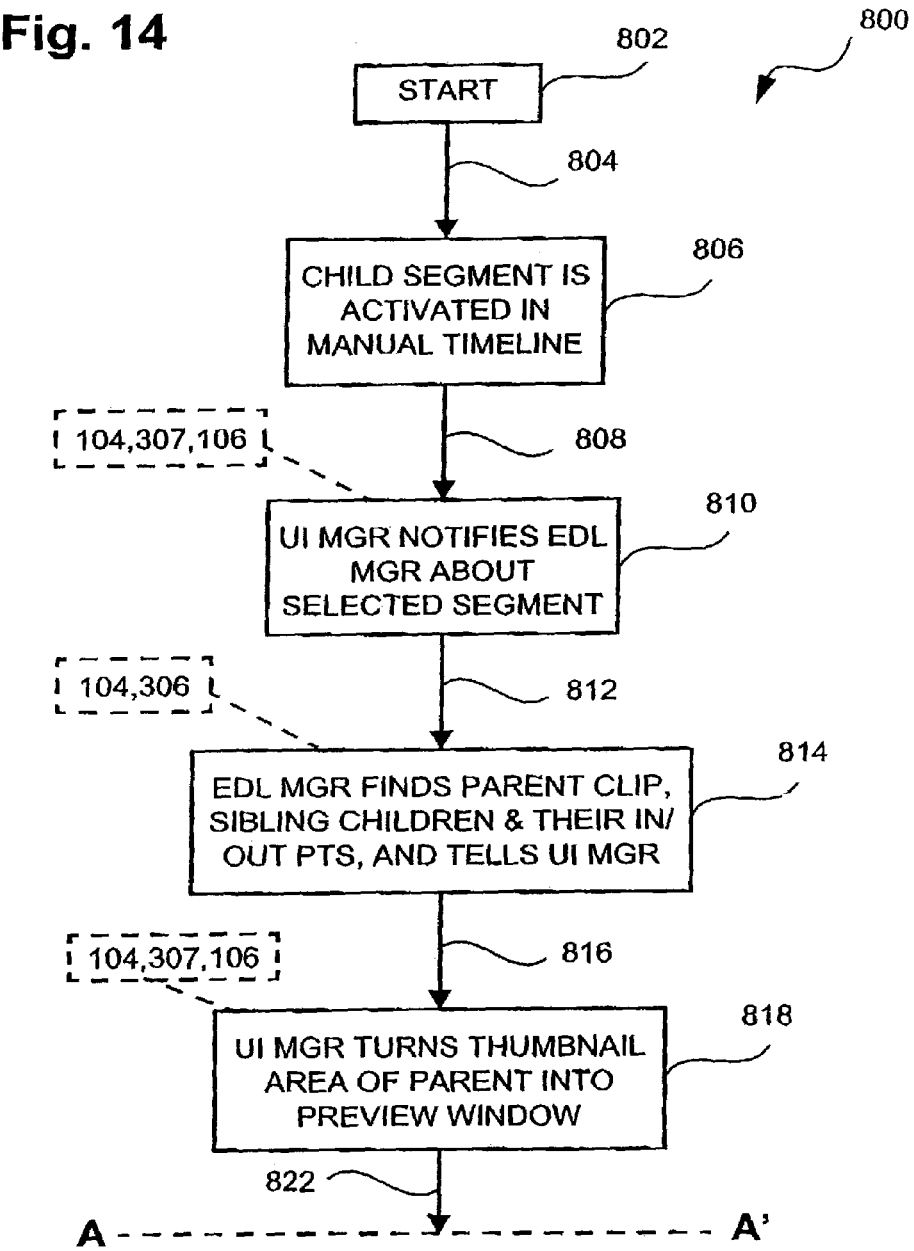
FIGS. 14 and 15 show a flow chart for the preview and editing function.
Figure 15:
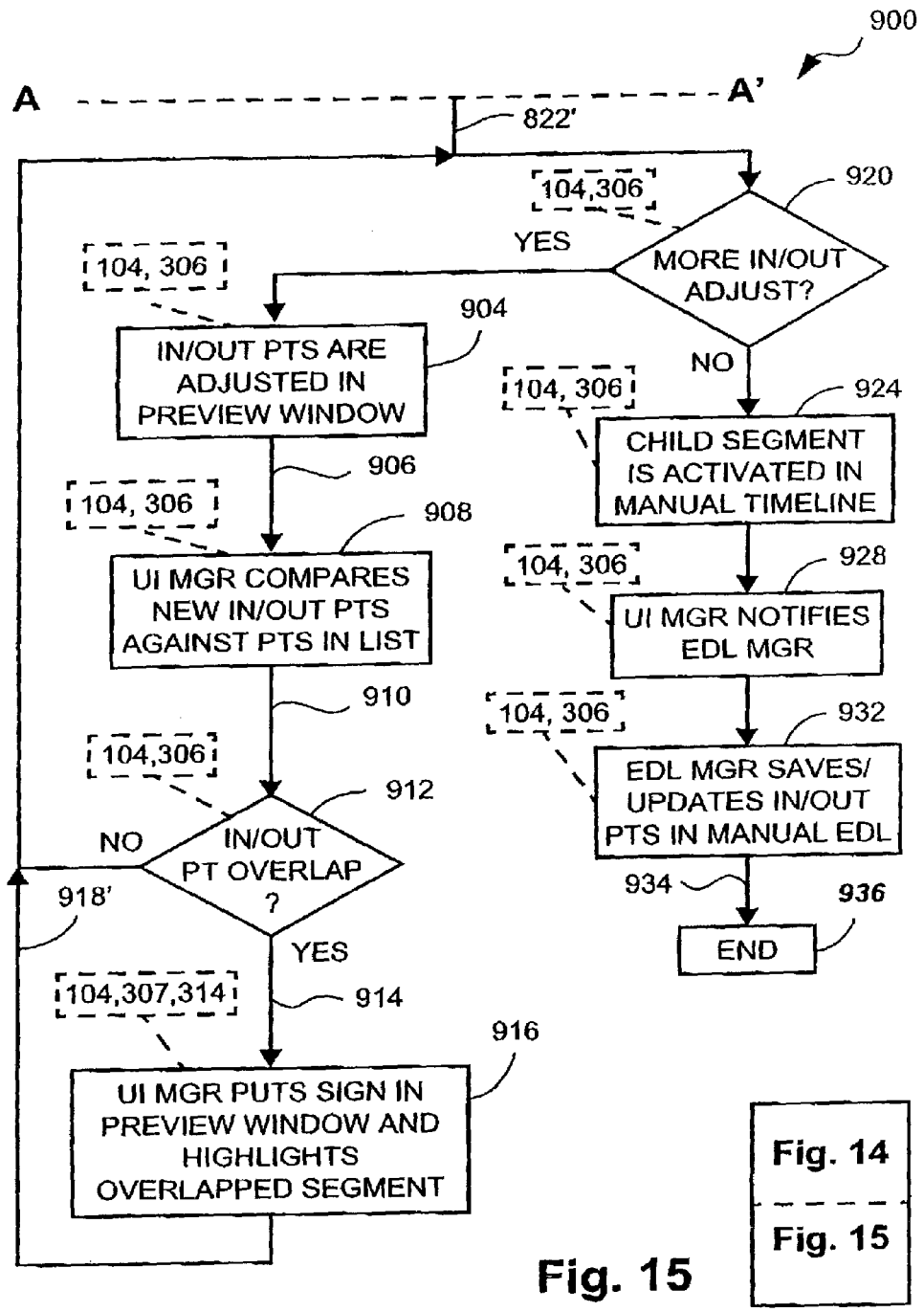

FIGS. 14 and 15 show process flow diagram segments 800 and 900 relating to the aforementioned editing process The process fragment 800 commences with a starting step 802, after which a child segment is activated in the manual timeline 606 in a step 806. In a subsequent step 810 the user interface manager 200 notifies the EDL manager 202 which child segment has been activated in the manual timeline 606. Thereafter, in a step 814, the EDL manager 202 identifies a reference 212 to the corresponding parent clip. The EDL manager 202 generates a list (called LIST A) of in and out points relating to both the child segment that has been activated as well as other child segments derived from the corresponding parent clip, and passes LIST A to the UI manager 200. Subsequently, in a step 818 the user interface manager 200 turns the thumbnail area 636 of the corresponding parent clip 616' into a preview window, as was described with reference to FIG. 13. Thereafter, the process segment 800 is directed, in accordance with an arrow 822, to a corresponding arrow 822' in FIG. 15.

FIG. 15 shows a process segment 900 commencing with a testing 920, which ascertains whether further adjustment of in/out points is required. If this is the case, then the process segment 900 is directed in accordance with a "yes" arrow to a step 904 in which the in and out points are adjusted with reference to the preview window 636, as was described with reference to FIG. 13. Thereafter, the process segment 900 is directed to a step 908 in which the user interface manager 200 compares the new (adjusted) in and out points against the list of in and out points that has been generated (ie. LIST A). In a following testing step 912 the process segment 900 checks whether there is any overlap between the new in and out points and the in and out points in LIST A. If overlap is found, then the user interface manager 200 displays, in a step 916, the star 634 in the preview window 636 and also highlights the child segment with which overlap has occurred. Thus, for example, if the child segment 602' (see FIG. 13) has been activated and is being previewed, and if the out point 708 is adjusted in a rightward direction beyond the point 710, thereby overlapping with the child segment 628', then the star 634 is displayed in the preview window 636, and the child segment 628' is highlighted in the manual timeline 606'. Thereafter, the process segment 900 is directed, in accordance with an arrow 918', back to the testing step 920. If, on the other hand, no overlap is detected in the testing step 912, then the process segment 900 is directed in accordance with a "no" arrow back to the step 920.

Returning to the step 920, if no further adjustment of in/out points is required, then the process segment 900 is directed in accordance with a "no" arrow to a step 924 in which the child segment in the manual timeline 606 is again "activated". This activation has a toggle effect, and accordingly, this second activation deactivates the preview of the activated child segment in the preview window 636. The preview window 636 is also returned to the thumbnail state. The process segment 900 is then directed to a step 928 in which the user interface manager 200 notifies the EDL manager 202 of the aforementioned activation. In a following step 932, the EDL manager 202 updates the in/out points in the manual EDL 204 for those child segments whose in and out points have changed. The process segment 900 is then directed in accordance with an arrow 934 to a step 936 where the process terminates.

The dual mode timeline arrangement also enables a user to identify a particular point of interest of a video production, and to thereby identify the particular child segment containing that point of interest. Having particular regard to video productions that have been compiled using the auto edit timeline arrangement described in regard to FIG. 3, this capability enables the user to view the automatically edited production, and to visually identify particular child segments for further manual editing.

Figure 16:
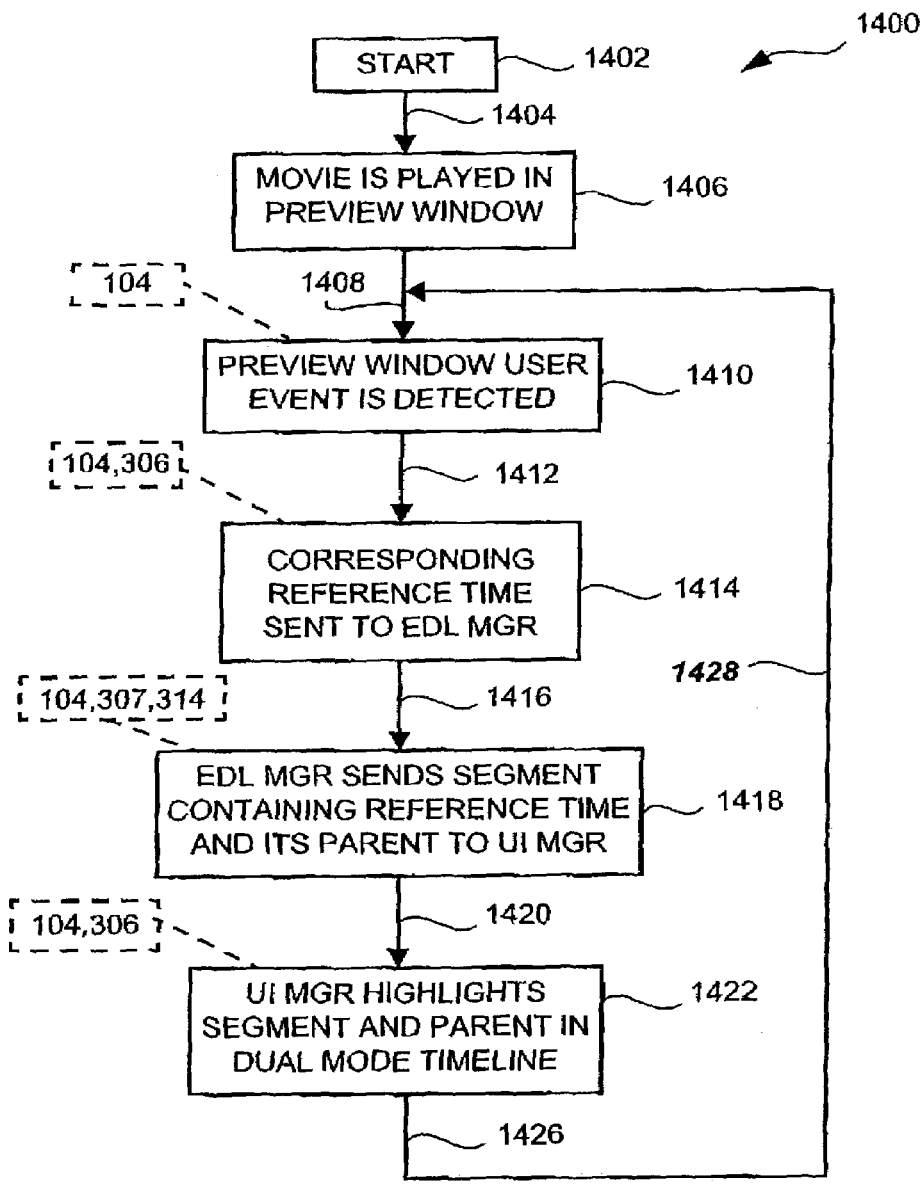
FIG. 16 shows a flow chart for identifying a parent clip and child segments relating to a user selected time instant in the edited video production.

FIG. 16 shows a process 1400 for identifying child segments of interest for further manual editing. The process 1400 commences with a start step 1402, after which a movie is played in a preview window in a step 1406. Thereafter, in a step 1410, the user clicks with the mouse cursor on the preview screen, thereby identifying a particular time instant of interest. A subsequent step 1414 sends a corresponding reference time to the EDL manager 202. The EDL manager 202 scans through the time duration covered by each child segment, to determine which child segment contains the particular time of interest. Thereafter, the EDL manager 202 finds the associated parent clip via the reference thereto contained in the child segment.

In a subsequent step 1418 the EDL manager 202 sends respective identifiers for the child segment containing this reference time and the parent clip from which the child segment has been derived to the UI manager 200. Thereafter, in a step 1422, the UI manager 200 highlights the child segment and the parent clip in the dual-mode timeline GUI 700.

INDUSTRIAL APPLICABILITY

It is apparent from the above that the arrangements described are applicable to the multi-media data processing industries.

The foregoing describes only some embodiments of the present invention, and modifications and/or changes can be made thereto without departing from the scope and spirit of the invention, the embodiments being illustrative and not restrictive.

The invention claimed is:

1. A method for editing a sequence of video clips, the method comprising the steps of:
   auto-editing, using an auto-editing template, a parent video clip selected from the sequence of video clips to thereby produce a video production having a child video segment related to the parent video clip;
   maintaining information on the relationship between the parent video clip and said related child segment;
   displaying on a Graphical User Interface corresponding representations of the parent video clip, the video production, and said information; and
   manually editing, dependent upon said displayed information, said child video segment.

2. A method according to claim 1, wherein the representations of the parent video clip, the video production, and said information are displayed in a common editing window on the Graphical User Interface.

3. A method according to claim 1, wherein the representation of the information on the Graphical User Interface is established by displaying the parent video clip and the related child segment using the same display colour.

4. A method according to claim 1, wherein the representation of the information on the Graphical User Interface is established by displaying a graphical link between the displayed parent video clip and the displayed related child segment.

5. A method according to claim 1, wherein the representation of the information on the Graphical User Interface is established by displaying a textual link between the displayed parent video clip and the displayed related child segment.

6. A method according to claim 1, wherein:
   the auto-editing step is applied to a plurality of parent video clips selected from the sequence of video clips to thereby produce the video production having child video segments each related to one of the plurality of parent video clips;
   the maintaining step maintains information on the relationship between each child segment and the corresponding parent video clip;
   the displaying step displays on the Graphical User Interface corresponding representations of the plurality of parent video clips, the video production, and said information; and
   the manual editing step is performed, dependent upon said displayed information, in regard to said corresponding child video segments.

7. A method according to either claim 1 or claim 6, wherein each child segment and the corresponding related parent video clip is displayed in a distinct colour on the Graphical User Interface.

8. A method according to claim 1, wherein the maintaining step comprises the steps of:
   representing the parent video clip by a corresponding parent Edit Display List element in a source Edit Display List, said corresponding parent Edit Display List element having a reference to the parent video clip;
   representing the video production by a manual Edit Display List comprising at least one child Edit Display List element representing the child segment related to the parent video clip; wherein
   the parent Edit Display List element representing the parent video clip has a reference to the child Edit Display List element representing the child segment; and the child Edit Display List element representing the child segment has a reference to the parent Edit Display List element representing the parent video clip.

9. A method according to claim 8, comprising a further step of:
   deleting the related child segment by (a) deleting the child Edit Display List element, and (b) deleting, in the parent Edit Display List element, the reference to the child Edit Display List element.

10. A method according to claim 8, comprising a further step of:
    adding a new child segment by
    (a) creating a new child Edit Display List element in the manual Edit Display List, and
    (b) including in the parent Edit Display List element, a reference to the new child Edit Display List element.

11. A method for identifying, in a Graphical User Interface displaying (a) a source timeline depicting a plurality of parent video clips, the source timeline being characterised by a source Edit Display List and (b) a manual timeline depicting an associated video production having child segments extracted from said parent video clips, the manual timeline being characterised by a manual Edit Display List, the parent video clip from which a selected child segment in the video production has been extracted, the method comprising the steps of:
    selecting the child segment in the manual timeline;
    identifying, in the manual Edit Display List, the child Edit Display List element representing the selected child segment; and
    determining, from the child Edit Display List element, a reference to the parent video clip from which the child segment has been extracted.

12. A method according to claim 11, wherein the reference to the parent video clip comprises a reference to a parent Edit Display List element in the source Edit Display List representing the parent video clip.

13. A method for identifying, in a Graphical User Interface displaying (a) a source timeline depicting a plurality of parent video clips, the source timeline being characterised by a source Edit Display List and (b) a manual timeline depicting an associated video production having child segments extracted from extracted from at least some of said parent video clips, said manual timeline being characterised by a manual Edit Display List, a child segment extracted from a selected parent video clip in the source timeline, the method comprising the steps of:
    selecting the parent video clip in the source timeline;
    identifying, in the source Edit Display List, the parent Edit Display List element representing the selected parent video clip; and
    determining, from the parent Edit Display List element, a reference to the extracted child segment.

14. A method for editing, in a Graphical User Interface displaying (a) a source timeline depicting a plurality of parent video clips, the source timeline characterised by a source Edit Display List and (b) a manual timeline depicting an associated video production having child segments extracted from said parent video clips, said manual timeline characterised by a manual Edit Display List, a child segment in the manual timeline, the method comprising the steps of:

activating the child segment in the manual timeline;

identifying, in the manual Edit Display List, the child Edit Display List element representing the activated child segment;

determining, from the child Edit Display List element, attributes for the activated child segment; and editing said attributes.

15. An apparatus for editing a sequence of video clips, the apparatus comprising:

an auto-editor for auto-editing, using an auto-editing template, a parent video clip selected from the sequence of video clips to thereby produce a video production having a child video segment extracted from the parent video clip;

means for maintaining information on the relationship between the parent video clip and said extracted child segment;

a Graphical User Interface for displaying corresponding representations of the parent video clip, the video production, and said information; and a manual editor for manually editing, dependent upon said displayed information, said child video segment.

16. An apparatus according to claim 15, wherein the Graphical User Interface includes means for displaying said corresponding representations of the parent video clip, the video production, and said information in a common editing window.

17. An apparatus according to claim 15, wherein the Graphical User Interface includes means for displaying the parent video clip and the related child segment using the same display colour.

18. An apparatus according to claim 15, wherein the Graphical User Interface includes means for displaying a graphical link between the displayed parent video clip and the displayed related child segment.

19. An apparatus according to claim 15, wherein the Graphical User Interface includes means for displaying a textual link between the displayed parent video clip and the displayed related child segment.

20. An apparatus according to claim 15, wherein:

the auto-editor is adapted to auto-edit a plurality of parent video clips selected from the sequence of video clips to thereby produce the video production having child video segments each related to one of the plurality of parent video clips;

the means for maintaining information is adapted to maintain information on the relationship between each child segment and the corresponding parent video clip;

the Graphical User Interface is adapted to display corresponding representations of the plurality of parent video clips, the video production, and said information; and the manual editor is adapted to manually edit, dependent upon said displayed information, said corresponding child video segments.

21. An apparatus according to either claim 15 or claim 20, wherein the Graphical User Interface includes means for displaying each child segment and the corresponding related parent video clip in a distinct colour on the Graphical User Interface thereby to establish the representation of the information.

22. An apparatus according to claim 15, further comprising:

a source Edit Display List for representing the parent video clip using a corresponding parent Edit Display List element, said parent Edit Display List element having a reference to the parent video clip;

a manual Edit Display List for representing the video production using child Edit Display List elements one of which represents the child segment related to the parent video clip; wherein the parent Edit Display List element representing the parent video clip has a reference to the child Edit Display List element representing the child segment; and the child Edit Display List element representing the child segment has a reference to the parent Edit Display List element representing the parent video clip.

23. An apparatus comprising:

an auto-editor for auto-editing, using an auto-editing template, a parent video clip selected from a sequence of video clips to thereby produce a video production having a child video segment extracted from the parent video clip;

a Graphical User Interface;

means for displaying on the Graphical User Interface (a) a source timeline depicting said parent video clip said source timeline characterised by a source Edit Display List and (b) a manual timeline depicting said video production the manual timeline characterised by a manual Edit Display List;

means for selecting the child segment in the manual timeline;

means for identifying, in the manual Edit Display List, the child Edit Display List element representing the selected child segment; and means for determining, from the child Edit Display List element, a reference to the parent video clip from which the child segment has been extracted.

24. An apparatus according to claim 23, wherein the reference to the parent video clip comprises a reference to a parent Edit Display List element in the source Edit Display List representing the parent video clip.

25. An apparatus comprising:

an auto-editor for auto-editing, using an auto-editing template, a parent video clip selected from a sequence of video clips to thereby produce a video production having a child video segment extracted from said parent video clip;

a Graphical User Interface;

means for displaying on the Graphical User Interface (a) a source timeline depicting said parent video clip, said source timeline characterised by a source Edit Display List and (b) a manual timeline depicting said video production, said manual timeline characterised by a manual Edit Display List;

means for selecting the parent video clip in the source timeline;

means for identifying, in the source Edit Display List, the parent Edit Display List element representing the selected parent video clip; and means for determining, from the parent Edit Display List element, a reference to the extracted child segment.

26. An apparatus comprising:

an auto-editor for auto-editing, using an auto-editing template, a parent video clip selected from a sequence of video clips to thereby produce a video production having a child video segment extracted from the parent video clip;

a Graphical User Interface;

means for displaying on the Graphical User Interface (a) a source timeline depicting said parent video clip, said source timeline characterised by a source Edit Display List and (b) a manual timeline depicting the video production, said manual timeline characterised by a manual Edit Display List;

means for activating the child segment in the manual timeline;

means for identifying, in the manual Edit Display List, the child Edit Display List element representing the activated child segment;

means for determining, from the child Edit Display List element, attributes for the activated child segment; and means for editing said attributes.

27. An apparatus for editing a sequence of video clips, said apparatus comprising:

a memory for storing a program; and a processor for executing the program, said program comprising:

code for auto-editing, using an auto-editing template, a parent video clip selected from the sequence of video clips to thereby produce a video production having a child video segment related to the parent video clip;

code for maintaining information on the relationship between the parent video clip and said related child segment;

code establishing a Graphical User Interface for displaying corresponding representations of the parent video clip, the video production, and said information; and code for manually editing, dependent upon said displayed information, said child video segment.

28. An edited video clip when produced using an apparatus for editing a sequence of video clips, the apparatus comprising:

an auto-editor for auto-editing, using an auto-editing template, a parent video clip selected from the sequence of video clips to thereby produce a video production having a child video segment related to the parent video clip;

means for maintaining information on the relationship between the parent video clip and said related child segment;

a Graphical User Interface for displaying corresponding representations of the parent video clip, the video production, and said information; and a manual editor for manually editing, dependent upon said displayed information, said child video segment.

29. A computer-readable medium having recorded thereon a program for directing a processor to control an editing apparatus for editing a sequence of video clips, said program comprising:

code for auto-editing, using an auto-editing template, a parent video clip selected from the sequence of video clips to thereby produce a video production having a child video segment related to the parent video clip;

code for maintaining information on the relationship between the parent video clip and said related child segment;

code establishing a Graphical User Interface for displaying corresponding representations of the parent video clip, the video production, and said information; and code for manually editing, dependent upon said displayed information, said child video segment.

30. A computer readable medium having recorded thereon an Edit Display List data structure referring to a parent video clip and a child video segment extracted from the parent video clip, said Edit Display List data structure being adapted for directing a processor to control an editing apparatus for editing a sequence of video clips, said Edit Display List data structure comprising:

a source Edit Display List including a parent Edit Display List element having a reference to said parent video clip, and a reference to a child Edit Display List element in a manual Edit Display List, said child Edit Display List element being associated with the child video segment; and said manual Edit Display List including said child Edit Display List element having a reference to said source Edit Display List element.

* * * * *

UNITED STATES PATENT AND TRADEMARK OFFICE
CERTIFICATE OF CORRECTION

PATENT NO. : 7,359,617 B2
APPLICATION NO. : 10/393265
DATED : April 15, 2008
INVENTOR(S) : Choi Chi Evelene Ma Page 1 of 1

It is certified that error appears in the above-identified patent and that said Letters Patent is hereby corrected as shown below:

<u>COLUMN 11</u>

Line 58, "in/our" should read --in/out--.

<u>COLUMN 18</u>

Line 52, "extracted from" (second occurrence) should be deleted.

Signed and Sealed this

Twenty-fourth Day of March, 2009

JOHN DOLL
*Acting Director of the United States Patent and Trademark Office*